FIG_1

INVENTOR.
Edric W. Vredenburg

March 2, 1948.   E. W. VREDENBURG   2,436,983
DEVICE FOR SIMULTANEOUSLY FILLING AND WEIGHING BAGS
Filed April 7, 1945   5 Sheets-Sheet 2

FIG_2_

INVENTOR.
Edric W. Vredenburg
BY

March 2, 1948. E. W. VREDENBURG 2,436,983
DEVICE FOR SIMULTANEOUSLY FILLING AND WEIGHING BAGS
Filed April 7, 1945 5 Sheets-Sheet 3

FIG_3_

INVENTOR.
Edric W. Vredenburg
BY

March 2, 1948. E. W. VREDENBURG 2,436,983
DEVICE FOR SIMULTANEOUSLY FILLING AND WEIGHING BAGS
Filed April 7, 1945 5 Sheets-Sheet 4

FIG_4.

INVENTOR.
Edric W. Vredenburg
BY
Robert N. Lenoff,
Attorney

March 2, 1948.  E. W. VREDENBURG  2,436,983
DEVICE FOR SIMULTANEOUSLY FILLING AND WEIGHING BAGS
Filed April 7, 1945  5 Sheets-Sheet 5

INVENTOR.
Edric W. Vredenburg
BY
Robert H. Eckhoff
attorney

Patented Mar. 2, 1948

2,436,983

UNITED STATES PATENT OFFICE 2,436,983

DEVICE FOR SIMULTANEOUSLY FILLING AND WEIGHING BAGS

Edric W. Vredenburg, Berkeley, Calif.

Application April 7, 1945, Serial No. 587,184

2 Claims. (Cl. 249—63)

This invention relates to improvements in bag filling and weighing devices.

The present invention relates to a machine for weighing out and simultaneously depositing in a suitable container such as a bag, a powdered, a granular, or a similar free-flowing material such as sugar, salt, sulphur, insecticide dusts, fertilizers and the like. Although the invention will be described as it is successfully applied to bag filling, it can be utilized with other containers. However, the filling of bags presents certain peculiar problems and the present machine has certain unique advantages as applied to bag filling.

It is in general the broad object of the present invention to provide a simple and improved machine for feeding from a large supply of a powdered or granular material into a positioned container and, simultaneously with the filling of the container, accurately weighing out the batch, the feed being discontinued upon the batch weight being attained.

A further object of the present invention is to provide a novel feed mechanism for delivering powdered and granular materials to a container.

The invention includes other objects and features of advantage, some of which, together with the foregoing, will appear hereinafter wherein the present preferred form of machine of this invention is disclosed.

Referring to the drawings accompanying and forming a part hereof,

Figure 1:
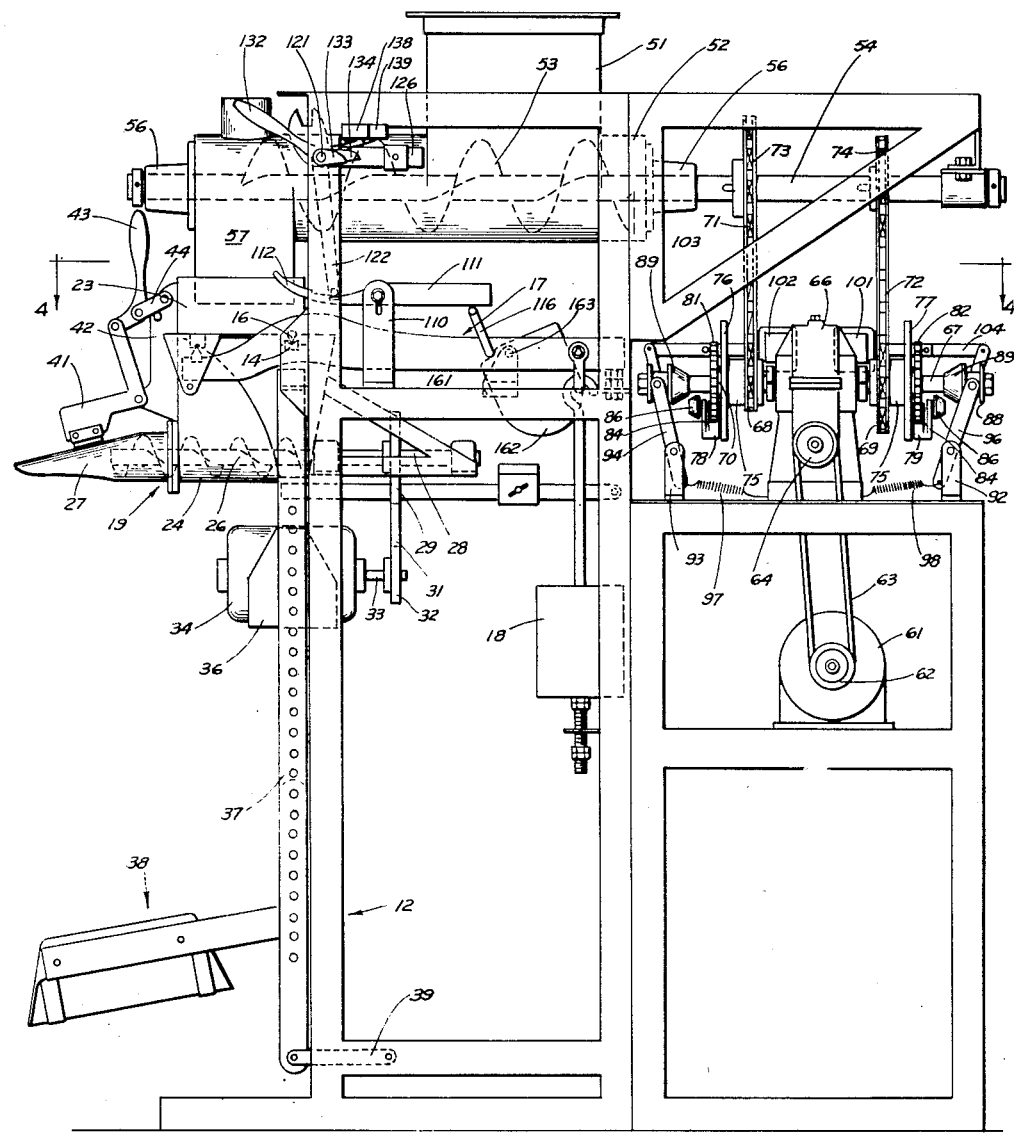
Figure 1 is a side elevation with portions thereof broken away to illustrate the construction.
Figure 2:
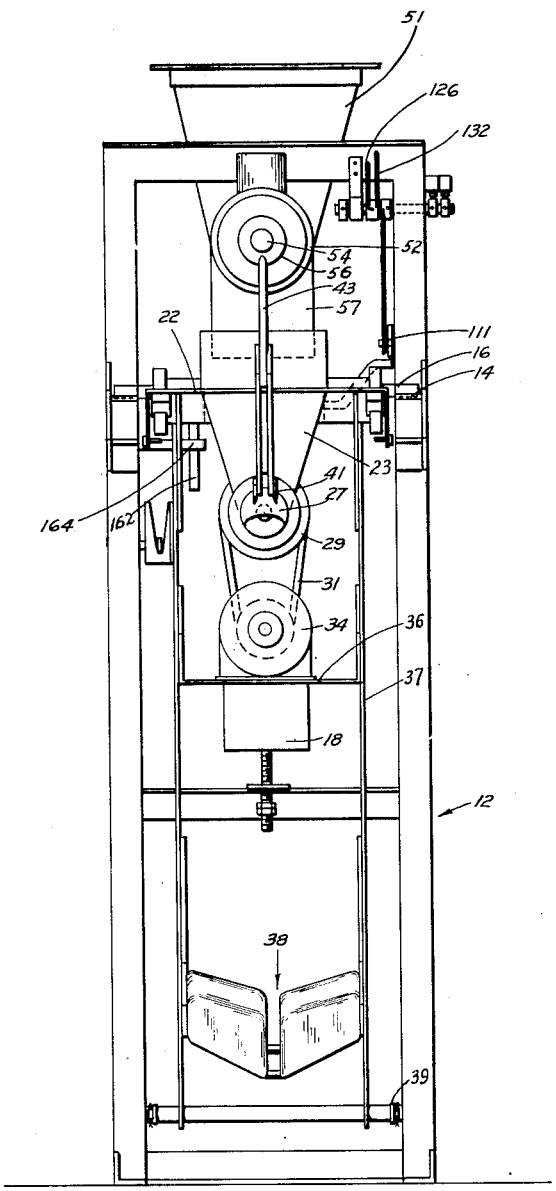
Figure 2 is a front elevation of the machine shown in Figure 1.
Figure 3:
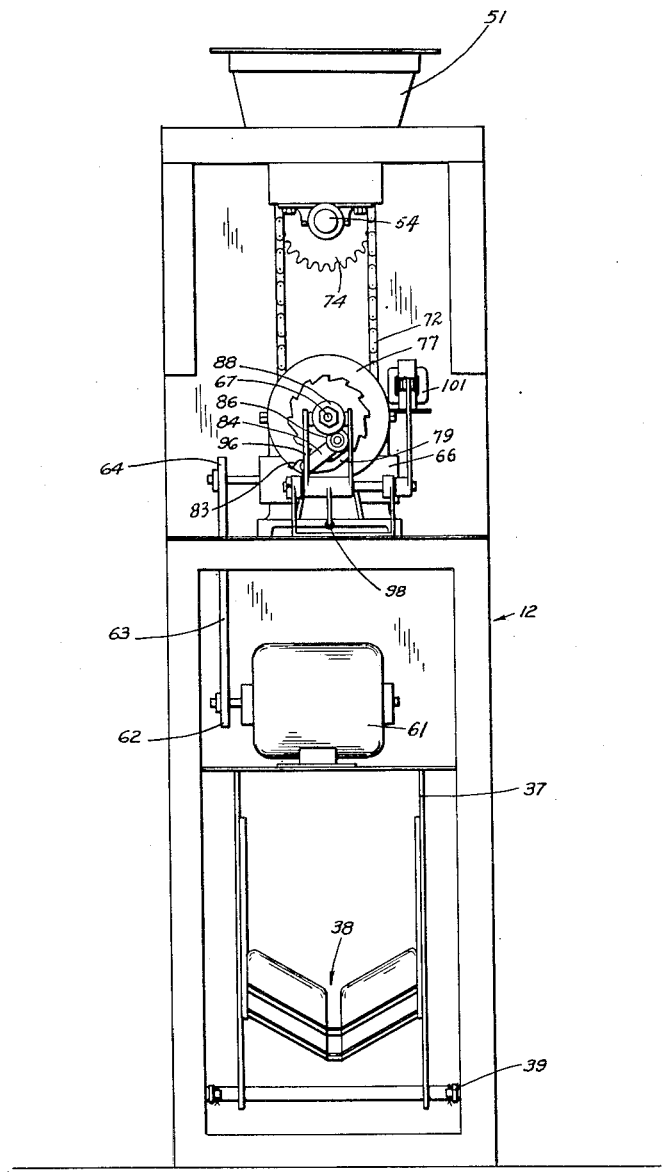
Figure 3 is an end elevation of the machine shown in Figure 1.
Figure 4:
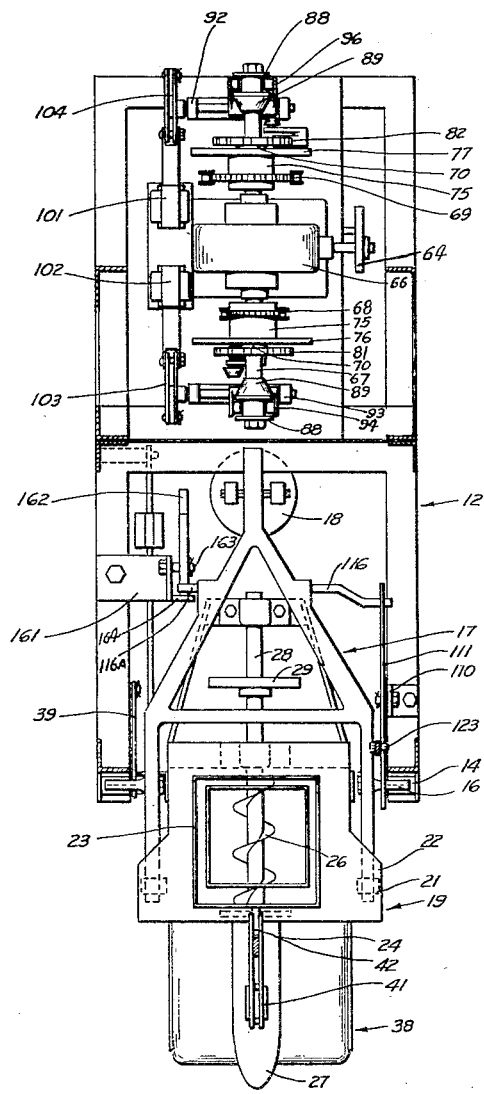
Figure 4 is a section taken along line 4—4 of Figure 1.

Referring to the drawing, the machine includes a suitable frame 12 made up of angle iron and other suitable structural elements to provide the necessary support. In the upper portion of the frame, pivot blocks 14 are mounted and in these are engaged knife edges 16 carried upon opposite sides of a weighing frame generally indicated at 17. At one end of the weighing frame, a weight 18 is suspended to tare a container and provide a weight load coordinated with the weight of material to be placed in the bag. On the other end of the frame, a bag filling structure, generally indicated by numeral 19, is mounted upon knife edges 21.

The bag filling structure 19 includes a plate 22 having a material receiving duct 23 thereon delivering material into a screw conveyor casing 24 positioned at the bottom of the duct. A screw flight 26 is positioned in the duct to deliver material to the discharge outlet or nozzle 27, the screw conveyor flight including a shaft 28 carrying a pulley 29. A belt 31 is trained about pulley 29 and about a pulley 32 on a shaft 33 of electric motor 34. The electric motor is mounted in a suitable bracket 36 in a bag support frame 37 which is attached to and depends from plate 22. The frame 37 is adjustable in position so that bags or containers of various heights can be supported upon a bag chair generally indicated at 38 and extending forwardly from the frame cooperatively with respect to and beneath the nozzle 27 to support the bag bottom. Bag filling structure 19, as has been related, is supported upon one end of the weighing frame 17, the frame 37 depending therefrom.

The lower end of the frame 37 is guided by parallel links 39 attached to frame 12.

When it is desired to use a typical, so-called "valved bag" having a sewn end with a top or a side opening adapted to admit the bag nozzle 27, a bag clamping member 41 is mounted upon a plate 42 attached to the front of duct 23. This member is adapted to be raised and lowered between a bag releasing position and a bag retaining position by handle 43 and link 44. The handle 43, the link 44 and the member 41 are so pivoted with respect to each other as to provide a toggle mechanism, the toggle being set in bag retaining position when the handle is in the position shown in Figure 1 and being released when the handle is moved counterclockwise in Figure 1, as will be apparent from further consideration of this view.

To deliver material to the duct 23, an inlet duct 51 is provided in the top of the frame to discharge into a feed screw conveyor casing 52. A screw conveyor flight 53 is positioned upon a shaft 54 and extends through nearly to the end of this casing. Bearings 56 are provided at each end of the casing to support the shaft 54. A downspout 57 is provided from the casing 52 to deliver the material to duct 23 on the bag filling structure 19.

Means are provided for coordinating delivery of material to a positioned container and for controlling the rate of delivery and for finally cutting off delivery entirely in accordance with the quantity of material present in the container. This means include a power drive for shaft 54 which drive is controlled in accordance with the quantity of material which has been delivered to the container. For example, when an empty bag is positioned, the operator initiates the filling operation of the bag, the filling initially occurring at a maximum rate. As the bag fills, the rate of feed is reduced to a dribble feed rate until the bag attains its desired weight when the feed is discontinued.

To drive the shaft 54, a motor 61 is provided upon the frame, a pulley 62 on the motor having a belt 63 trained about a pulley 64 upon a suitable speed reduction unit indicated at 66. A shaft 67 projects from each side of this unit and carries a pair of spaced ratchet wheels 81 and 82 secured to the shaft and having a sleeve extension 70 extending along the shaft. Mounted on one extension 70 is a wheel 76 and, on the other, a wheel 77; each wheel has a sleeve 75 rotatable on a sleeve extension 70 and carrying either chain sprockets 68 or 69. Chains 71 and 72 are trained about these sprockets and about sprockets 73 and 74 on shaft 54, sprocket 68 being of smaller diameter than sprocket 69 and sprocket 73 being of larger diameter than sprocket 74, so that the shaft 54 is obviously driven at different speeds. When the drive is from sprocket 68 through chain 71 and sprocket 73, the shaft 54 will be rotated more rapidly than when the drive is from sprocket 69 through chain 72 and sprocket 74.

To control the rate of drive of shaft 54, each wheel 76 and 77 has in cooperation with it, pawls respectively indicated at 78 and 79 and normally held in engagement with the teeth on the cooperating ratchet wheels 81 and 82 by springs 83.

The teeth on wheel 82 are in the form of notches engaged positively by an associated pawl 79 when the drive is from sprocket 69; the teeth on wheel 81 can be engaged by its associated pawl 78 only in one direction when the drive is from sprocket 68, the pawl 78 slipping over the teeth if the pawl 78 moves faster in the same direction, as happens when the drive is from sprocket 69. Each pawl includes a projecting arm 84 carrying a rotatable wheel 86 thereon. A collar 88, mounted on each end of shaft 67, carries a rotatable cone 89 adapted to engage the cooperating wheel 86 and lift the pawl out of engagement with the teeth on the cooperating ratchet wheel.

To move the cones 89 selectively, brackets 92 and 93 are mounted upon the frame and support levers 94 and 96 pivotally, springs 97 and 98 respectively biasing levers 94 and 96 so as to keep the cones from engaging the wheels. In the position shown in Figure 1, both ratchets are engaged but since gears 69—74 drive shaft 54 at a greater speed than gears 73—68, pawl 78 slips over the teeth on ratchet wheel 81. When lever 96 is moved to release pawl 79, the drive is through gears 68—73, pawl 78 immediately engaging the wheel 81 for positive driving connection. When pawl 78 is released, pawl 79 being disengaged, the drive ceases instantly although motor 61 continues to rotate.

To move levers 94 and 96, solenoids 101 and 102 are mounted upon the frame and links 103 and 104 extend from them to engage the ends of levers 94 and 96. As will be presently described, the solenoids are selectively energized to bring one and then the other of the cones into engagement with one of the wheels 86 and so raise the corresponding pawl from engagement with its associated ratchet wheel. In this way, shaft 67 being rotated, the drive of shaft 54 can be selectively controlled and, due to the different size of the sprockets employed on the respective shafts, the rate of drive of shaft 54 varied. The control of solenoids 101 and 102 will now be described.

Mounted upon the side of the frame 12 is an extension 110 and pivoted intermediate its ends upon the extension 110, is a lever 111 having a curved end 112. The disposition of the weight of lever 111 about its pivot point on the extension 110 is such that lever 111 normally tends to rock in a clockwise direction in Figures 1 and 5–7. The curved end of lever 112 includes notches 114 and 115 therein. Lever 111 is rocked counterclockwise by an extension 116 on weighing frame 17 engaging lever 111 as the weighing frame moves counterclockwise in Figure 1 as a bag or other container is filled.

Mounted cooperatively on a shaft 121 carried on an upper portion of the frame is a lever 122 having a tooth 123 thereon adapted to engage successively notch 115 and then notch 114 and finally the curved end of lever 111. Also mounted upon shaft 121 is a lever 126 carrying an adjustable weight 127 at one end and having its other end slotted as at 128 to cooperate with a stop member 129 on frame 12 and so limit the degree of rotation of shaft 121. A handle 132 is also secured upon shaft 121, while arms 133 and 134 are also mounted upon the shaft for reasons which will presently appear.

To initiate the filling operation, an operator places a bag in position on nozzle 27 and then clamps the bag in place. The handle 132 is then rocked counterclockwise in Figure 5 until tooth 123 engages notch 115. In this position, arms 133 and 134 will also be rocked counterclockwise to engage and open switch control elements 136 and 137 respectively provided in suitable switch structures such as microswitches 138 and 139. A microswitch is a well-recognized and definite type of switch; a suitable form is described in Patent Number 1,960,020. With both switches open, solenoids 101 and 102 are not energized and both cones 89 are free of wheels 86. In this position (Figure 1) the drive for shaft 54 is at the high speed through sprockets 69 and 74, pawl 78 slipping over the teeth on ratchet wheel 81.

Figures 5, 6:
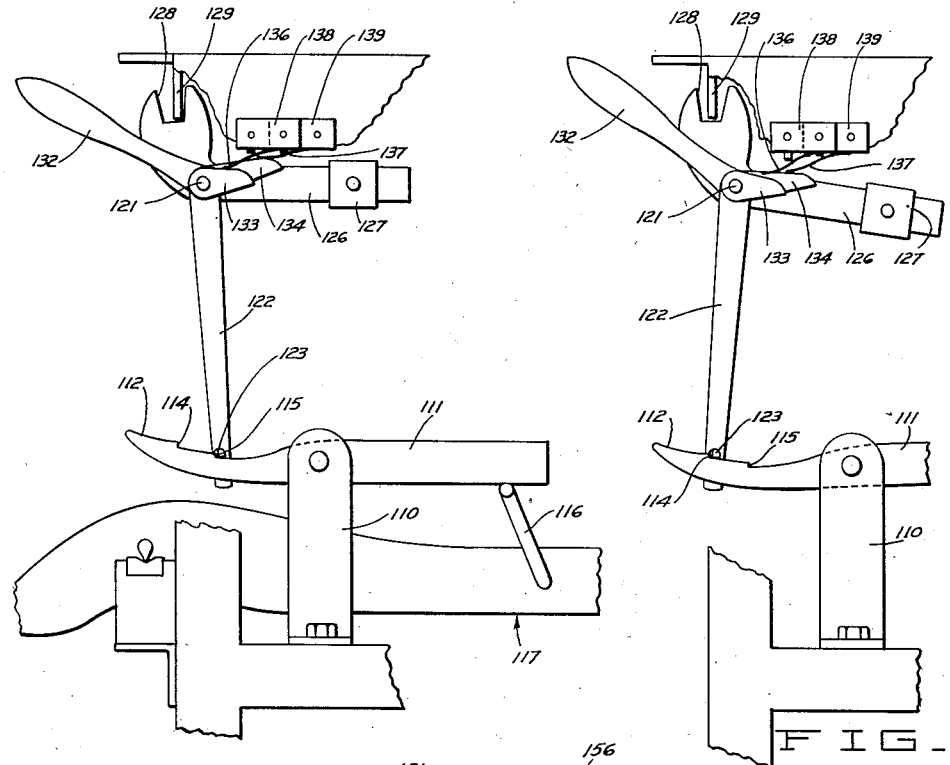
Figures 5, 6 and 7 are fragmentary views illustrating the mechanism utilized to control the material feed and to coordinate the feed with the weight of material present in the container.

As weight is applied to the weighing frame and the latter rocks counterclockwise, extension 116 will rock lever 111 counterclockwise and tooth 123 will slip off notch 115 to engage upon notch 114 (Figure 6). This action permits contact 136 to close microswitch 138, due to the clockwise rotation of arms 133 and 134. However, arm 134 is still in position to maintain element 137 in switch 139 in open position. Initially, shaft 54 will be driven at high speed, the pawl 78 slipping over the teeth on wheel 81 on the low speed side because of the positive high speed drive. However, upon the energizing of solenoid 101, the drive of conveyor shaft 54 will instantaneously decrease and the rate of speed will correspondingly decrease. When the container attains its full weight, tooth 123 is released from notch 114 (Figure 7) and lever 122 moves to its final position determined by notch 128 and stop 129 as appears in Figure 7. In this position switch 139 is closed, pawl 78 is released from wheel 81 and shaft 54 is stopped.

Figure 8:
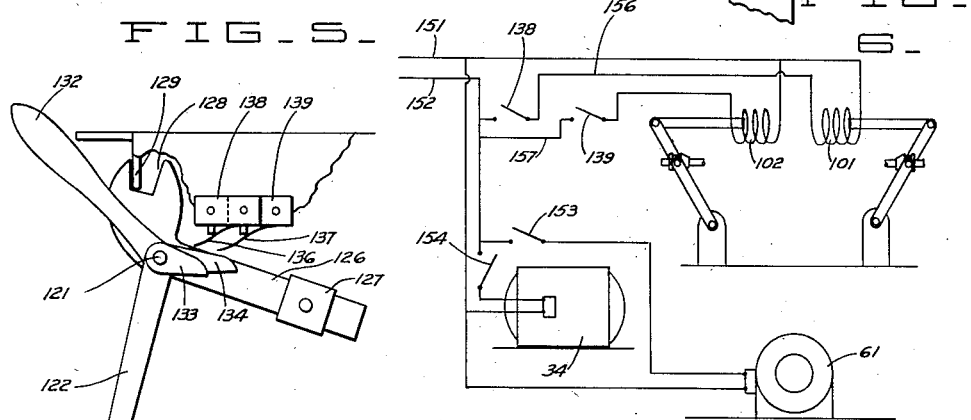
Figure 8 is a diagrammatic representation of the circuit employed.
Figure 7:
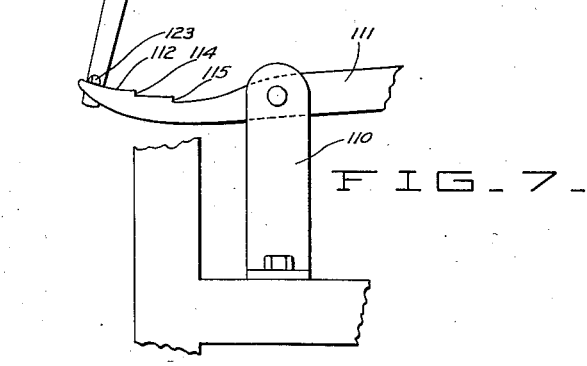

Referring to Figure 8, power is supplied from lines 151 and 152 to motor 61 under the control of manual switch 153 and, under the control of manual switch 154, to motor 34. At the same time, power is supplied from lines 151 and 152 to microswitch 138 and thence from this through line 156 and line 151 to solenoid 101. For microswitch 139, power is supplied from line 151, 152 and line 157 to solenoid 102. The normal position of the microswitches is that in which the solenoids are energized so that shaft 54 is not rotated. When the operator rocks lever 132, the switches are opened, the solenoids de-energized and shaft 54 rotated.

To assist in securing the proper feed rate, a bracket 161 is mounted on the side of frame 12. A cam-like weight 162 is pivoted at 163 on this bracket; when the weighing frame is in bag loading position, weight 162 bears against extension 116A and loads the frame falsely until the frame has rocked sufficiently to permit weight 162 to engage stop 164. At this point, switch 138 is closed and solenoid 101 energized to initiate the low rate or dribble feed.

When the filling operation has been concluded, the operator releases lever 43 and removes the bag, replacing the filled bag with an empty one. Lever 132 is then rocked to initiate rotation of shaft 54 and feed material to the duct 23. It is essential that conveyor 26 move the material from the duct at a rate in excess of that at which the material is delivered by conveyor 53 to permit the air from the valved bag to issue through the duct as the solid material is forcefully fed into the bag. By having conveyor flight 53 terminate short of the end of the casing 52, material is not held in the casing to fall into the duct 23 intermittently—the material spilling out in a continuous stream instead of at a varying rate which would destroy the accuracy of the batch weight.

I claim:

1. A bag filling device comprising a stationary feed hopper; a movable weighing frame; bag support and filling means on said frame for discharging material received from said feed hopper into a bag on said frame; means for moving material positively from said hopper for discharge into a positioned bag comprising a first shaft extending through said hopper and having a screw conveyor flight thereon to move material therethrough for discharge from said hopper, a second shaft, a first drive means for driving said first shaft from the second shaft at a first speed, a second drive means for driving said first shaft from said second shaft at a second speed less than said first speed, a first clutch associated with said first drive means and normally engaged to drive said first shaft at said first speed, a first solenoid controlling operation of said first clutch, a second clutch associated with said second drive means and including an over-running pawl rendering said second clutch ineffective while said first drive is effective to drive said first shaft at said first speed and cause over-running of said over-running pawl, and a switch operated by movement of said weighing frame for controlling operation of said first solenoid and rendering said first solenoid effective to disengage said first clutch whereby said over-running pawl ceases to over-run and said over-running pawl is rendered effective to drive said first shaft at said second speed.

2. A bag filling device comprising a weighing frame movable between an unloaded position and a container loaded position, a first and a second switch each actuatable upon movement of said frame from said unloaded to said loaded position, a stationary hopper, a screw conveyor flight in said hopper on a first shaft for discharging material from said hopper, a second shaft, a first drive means for driving the first shaft from the second shaft at a first speed, a second drive means for driving the first shaft from the second shaft at a second speed less than said first speed, a first clutch associated with said first drive means and normally engaged to drive said first shaft at said first speed, a second clutch associated with said second drive means and including an over-running pawl rendering said second clutch ineffective while said first drive means is effective to drive said first shaft at said first speed and cause over-running of said over-running pawl, a first solenoid in a first circuit with said first switch for controlling operation of said first clutch, and a second solenoid in a second circuit with said second switch for controlling operation of said second clutch.

EDRIC W. VREDENBURG.

REFERENCES CITED

The following references are of record in the file of this patent:

UNITED STATES PATENTS

| Number | Name | Date |
|---|---|---|
| 570,298 | Richards | Oct. 27, 1896 |
| 572,089 | Richards | Nov. 24, 1896 |
| 579,445 | Richards | Mar. 23, 1897 |
| 585,976 | Richards | July 6, 1897 |
| 615,197 | Richards | Nov. 29, 1898 |
| 931,800 | Ruether et al. | Aug. 24, 1909 |
| 2,212,419 | Harmon | Aug. 20, 1940 |

FOREIGN PATENTS

| Number | Country | Date |
|---|---|---|
| 843,683 | France | Apr. 3, 1939 |